US012517443B2

(12) United States Patent
Fujihara et al.

(10) Patent No.: US 12,517,443 B2
(45) Date of Patent: Jan. 6, 2026

(54) METHOD FOR PRODUCING TONER FOR DEVELOPING ELECTROSTATIC CHARGE IMAGES, TONER FOR DEVELOPING ELECTROSTATIC CHARGE IMAGES, AND ELECTROSTATIC CHARGE IMAGE DEVELOPER

(71) Applicant: FUJIFILM Business Innovation Corp., Tokyo (JP)

(72) Inventors: Yoshimasa Fujihara, Kanagawa (JP); Yukiaki Nakamura, Kanagawa (JP); Takahiro Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 682 days.

(21) Appl. No.: 17/943,761

(22) Filed: Sep. 13, 2022

(65) Prior Publication Data

US 2023/0324820 A1 Oct. 12, 2023

(30) Foreign Application Priority Data

Mar. 24, 2022 (JP) ................................ 2022-049081

(51) Int. Cl.
*G03G 9/08* (2006.01)

(52) U.S. Cl.
CPC .................................. *G03G 9/0804* (2013.01)

(58) Field of Classification Search
CPC .................................................... G03G 9/0804
See application file for complete search history.

(56) References Cited

U.S. PATENT DOCUMENTS

| | | | | |
|---|---|---|---|---|
| 7,951,519 | B2 | 5/2011 | Iwazaki et al. | |
| 2005/0181294 | A1* | 8/2005 | Hopper | G03G 9/09741 430/105 |
| 2009/0081573 | A1* | 3/2009 | Iwazaki | G03G 9/1139 430/108.7 |

FOREIGN PATENT DOCUMENTS

| | | | |
|---|---|---|---|
| JP | 2000-131882 | A | 5/2000 |
| JP | 2006-276073 | A | 10/2006 |
| JP | 2009-075342 | A | 4/2009 |
| JP | 2016-126158 | A | 7/2016 |
| JP | 2016-133742 | A | 7/2016 |
| JP | 2019-66735 | A | 4/2019 |

OTHER PUBLICATIONS

Communication issued Oct. 21, 2025 in Japanese application No. 2022-049081.

* cited by examiner

*Primary Examiner* — Mark F. Huff
*Assistant Examiner* — Boone Alexander Evans
(74) *Attorney, Agent, or Firm* — Sughrue Mion, PLLC

(57) ABSTRACT

A method for producing a toner for developing electrostatic charge images includes: preparing a first dispersion containing, dispersed therein, first aggregated particles containing a binder resin; preparing a second dispersion containing second aggregated particles dispersed therein, the second aggregated particles being prepared by attaching resin particles to surfaces of the first aggregated particles in the first dispersion; heating the second dispersion to a fusion temperature at which the second aggregated particles in the second dispersion are fused to each other; and holding the second dispersion at the fusion temperature. 20 mass % or more of a weak acid relative to the mass of the second aggregated particles is added to the second dispersion during the heating of the second dispersion or the holding of the second dispersion, or during the heating of the second dispersion and the holding of the second dispersion.

8 Claims, No Drawings

METHOD FOR PRODUCING TONER FOR DEVELOPING ELECTROSTATIC CHARGE IMAGES, TONER FOR DEVELOPING ELECTROSTATIC CHARGE IMAGES, AND ELECTROSTATIC CHARGE IMAGE DEVELOPER

CROSS-REFERENCE TO RELATED APPLICATIONS

This application is based on and claims priority under 35 USC 119 from Japanese Patent Application No. 2022-049081 filed Mar. 24, 2022.

BACKGROUND

(i) Technical Field

The present disclosure relates to a method for producing a toner for developing electrostatic charge images, a toner for developing electrostatic charge images, and an electrostatic charge image developer.

(ii) Related Art

Japanese Unexamined Patent Application Publication No. 2000-131882 discloses a method for producing a toner for developing electrostatic charge images including: adding an aggregating agent and a stabilizer to an aqueous dispersion containing at least polymer fine particles and colorant fine particles to associate a large number of the fine particles to each other; and thermally fusing the associated particles at a temperature higher than or equal to the glass transition temperature of the polymer fine particles, wherein the concentration of at least one of the aggregating agent or the stabilizer, which is a nonionic surfactant, is changed during thermal fusion.

Japanese Unexamined Patent Application Publication No. 2009-75342 discloses a method for producing a toner for developing electrostatic charge images including: an aggregated particle-forming step of forming aggregated particles by mixing a resin particle dispersion containing, dispersed therein, binder resin particles containing a crystalline polyester resin and a colorant dispersion containing a colorant dispersed therein and adding an aggregating agent to the resulting mixture; and a fusion-coalescence step of fusing and coalescing the aggregated particles with heating while adding an acid and a surfactant.

SUMMARY

Aspects of non-limiting embodiments of the present disclosure relate to a method for producing a toner for developing electrostatic charge images in which method the fusion time may be shortened while generation of coarse powder may be suppressed compared with a method including adding a strong acid to a second dispersion or adding less than 20 mass % of a weak acid relative to the mass of the second aggregated particles to the second dispersion in a step C of heating the second dispersion to a fusion temperature at which the second aggregated particles in the second dispersion are fused to each other or a step D of holding the second dispersion at the fusion temperature, or in the step C and the step D.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a toner for developing electrostatic charge images, the method including: preparing a first dispersion containing, dispersed therein, first aggregated particles containing a binder resin; preparing a second dispersion containing second aggregated particles dispersed therein, the second aggregated particles being prepared by attaching resin particles to surfaces of the first aggregated particles in the first dispersion; heating the second dispersion to a fusion temperature at which the second aggregated particles in the second dispersion are fused to each other; and holding the second dispersion at the fusion temperature, wherein 20 mass % or more of a weak acid relative to the mass of the second aggregated particles is added to the second dispersion during the heating of the second dispersion or the holding of the second dispersion, or during the heating of the second dispersion and the holding of the second dispersion.

DETAILED DESCRIPTION

Exemplary embodiments of the present disclosure will be described below. The following description and Examples are for illustrating the exemplary embodiments, but are not intended to limit the scope of the exemplary embodiments. A range of values expressed by using “to” in the present disclosure indicates a range including the values before and after “to” as the minimum value and the maximum value.

In ranges of values described stepwise in the present disclosure, the upper limit or the lower limit of one range of values may be replaced by the upper limit or the lower limit of another range of values. The upper limit or lower limit of any range of values described in the present disclosure may be replaced by a value described in Examples.

In the present disclosure, the term “step” includes not only an independent step but also a step that cannot be clearly distinguished from other steps but may accomplish an intended purpose.

In the present disclosure, each component may include two or more corresponding substances. In the present disclosure, the amount of each component in a composition refers to, when there are two or more substances corresponding to each component in the composition, the total amount of the substances present in the composition, unless otherwise specified.

In the present disclosure, each component may include two or more types of particles corresponding to each component. The particle size of each component refers to, when there are two or more types of particles corresponding to each component in the composition, the particle size of a mixture of two or more types of particles present in the composition, unless otherwise specified.

In the present disclosure, the “(meth)acrylic” refers to at least one of acrylic and methacrylic, and the “(meth)acrylate” refers to at least one of acrylate and methacrylate.

In the present disclosure, the “toner” refers to a “toner for developing electrostatic charge images”, the “developer” refers to an “electrostatic charge image developer, and the “carrier” refers to a “carrier for developing electrostatic charge images”.

Method for Producing Toner for Developing Electrostatic Charge Images

A method for producing a toner according to an exemplary embodiment includes:

- a step A of preparing a first dispersion containing, dispersed therein, first aggregated particles containing a binder resin;
- a step B of preparing a second dispersion containing second aggregated particles dispersed therein, the second aggregated particles being prepared by attaching resin particles to surfaces of the first aggregated particles in the first dispersion;
- a step C of heating the second dispersion to a fusion temperature at which the second aggregated particles in the second dispersion are fused to each other; and
- a step D of holding the second dispersion at the fusion temperature,
- wherein 20 mass % or more of a weak acid relative to the mass of the second aggregated particles is added to the second dispersion in the step C or the step D, or in the step C and the step D.

For example, there is a known method for producing toner particles including: aggregating binder resin particles and the like by using an aggregating agent, such as a metal salt; attaching a binder resin to the surfaces of the resulting first aggregated particles to form second aggregated particles; and then fusing the second aggregated particles to each other by heating. Such a method is called an emulsion aggregation (EA) method and involves aggregating material particles in a dispersion medium containing the material particles dispersed therein and then fusing and coalescing the aggregated particles to produce toner particles.

In the step of fusing the second aggregated particles, the second aggregated particles are fused to each other by heating the second aggregated particles to a certain temperature or higher, and the circularity of the fused and coalesced second aggregated particles (i.e., toner particles) is adjusted to a desired value. There is a method in which the second aggregated particles are heated at a high temperature, but this method takes a long time, and the binder resin in the second aggregated particles is hydrolyzed to partially form soft areas, which may generate coarse powder (i.e., coarse particles) due to adhesion between the toner particles.

To promote the fusion of the second aggregated particles, there is a method for adjusting the pH in the system by adding an acid to the dispersion containing the second aggregated particles dispersed therein. In this method, the second aggregated particles may be fused and coalesced into a desired circularity within a short fusion time, but the repulsive force may locally decrease on the surfaces of the second aggregated particles depending on the type of acid, which may cause adhesion between the particles to generate coarse powder. The fusion of the second aggregated particles may not be promoted sufficiently depending on the amount of acid added.

According to the method for producing a toner according to the exemplary embodiment having the features described above, the fusion time may be shortened while generation of coarse powder may be suppressed.

In the method for producing a toner according to the exemplary embodiment, 20 mass % or more of a weak acid relative to the mass of the second aggregated particles is added to the second dispersion containing the second aggregated particles dispersed therein in the step C or the step D, or in the step C and the step D, which are the steps of fusing the second aggregated particles to each other. When the added acid is a weak acid as described above, a local decrease in repulsive force may be suppressed on the surfaces of the second aggregated particles and, as a result, generation of coarse powder may be suppressed. When the amount of the weak acid added is specified as described above, the fusion of the second aggregated particles may be sufficiently promoted, and the fusion time to a desired circularity may be shortened.

In the present disclosure, the “fusion time” refers to the time until the fused and coalesced second aggregated particles (i.e., toner particles) reach a desired circularity after the second dispersion reaches the fusion temperature in the step C.

The details of the steps and the materials used in the steps in the method for producing a toner according to the exemplary embodiment will be described below.

In the method for producing a toner according to the exemplary embodiment, toner particles having a core-shell structure is obtained.

Step A

In the method for producing a toner according to the exemplary embodiment, the step A is performed first.

The step A involves preparing a first dispersion containing, dispersed therein, first aggregated particles containing a binder resin.

The first dispersion containing the first aggregated particles dispersed therein is prepared by aggregating at least binder resin particles in a dispersion containing at least the binder resin particles.

The dispersion used for preparing the first dispersion may contain release agent particles or colorant particles, or release agent particles and colorant particles, in addition to the binder resin particles. Therefore, the first aggregated particles in the first dispersion may be prepared by aggregating release agent particles or colorant particles, or release agent particles and colorant particles, together with the binder resin particles. In other words, the first aggregated particles in the first dispersion may contain at least one of a release agent or a colorant as well as the binder resin.

The dispersion used for preparing the first dispersion is prepared by, for example, preparing a resin particle dispersion containing binder resin particles, a release agent particle dispersion containing release agent particles, and a colorant particle dispersion containing colorant particles, and mixing these particle dispersions. These particle dispersions may be mixed in any order.

The common features of the resin particle dispersion, the release agent particle dispersion, and the colorant particle dispersion will be described below by collectively referring these particle dispersions to as a “particle dispersion”.

An exemplary embodiment of the particle dispersion is a dispersion prepared by dispersing a material in the form of particles in a dispersion medium by using a surfactant.

The dispersion medium for the particle dispersion may be an aqueous medium. Examples of the aqueous medium include water and alcohols. Water may be water with low ion content, such as distilled water or ion exchange water. These aqueous media may be used alone or in combination of two or more.

The surfactant used to disperse the material in the dispersion medium may be an anionic surfactant, a cationic surfactant, or a nonionic surfactant. Examples of the surfactant include anionic surfactants, such as sulfate salts, sulfonate salts, phosphate salts, and soaps; cationic surfactants, such as amine salts and quaternary ammonium salts; and nonionic surfactants, such as polyethylene glycols, alkylphenol ethylene oxide adducts, and polyhydric alcohols. The surfactant may be used alone or in combination of two or more. A nonionic surfactant may be used in combination with an anionic surfactant or a cationic surfactant.

Examples of the method for dispersing the material in the form of particles in the dispersion medium include known dispersion methods using a rotary shear homogenizer, a ball mill having media, and a sand mill, and Dyno-Mill.

Examples of the method for dispersing the resin in the form of particles in the dispersion medium include phase-inversion emulsification. The phase-inversion emulsification is a method for dispersing a resin in the form of particles in an aqueous medium. This method involves dissolving a resin in a hydrophobic organic solvent capable of dissolving the resin; adding a base to the organic continuous phase (O phase) to cause neutralization; and then adding an aqueous medium (W phase) to cause phase inversion from W/O to O/W.

The volume average particle size of the particles dispersed in the particle dispersion is preferably 30 nm or more and 460 nm or less, more preferably 50 nm or more and 300 nm or less, still more preferably 60 nm or more and 250 nm or less, yet still more preferably 80 nm or more and 200 nm or less.

The volume average particle size of the particles in the particle dispersion refers to the particle size at 50% cumulative volume from the smallest particle size in the particle size distribution measured with a laser diffraction-type particle size distribution analyzer (e.g., LA-700 available from Horiba Ltd.).

The amount of the particles contained in the particle dispersion is preferably 5 mass % or more and 50 mass % or less, more preferably 10 mass % or more and 40 mass % or less, still more preferably 15 mass % or more and 30 mass % or less.

Binder Resin

Examples of the binder resin include vinyl resins composed of a homopolymer of a monomer or a copolymer of two or more monomers selected from, for example, styrenes (e.g., styrene, p-chlorostyrene, α-methylstyrene), (meth) acrylic acid esters (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate), ethylenically unsaturated nitriles (e.g., acrylonitrile, methacrylonitrile), vinyl ethers (e.g., vinyl methyl ether, vinyl isobutyl ether), vinyl ketones (e.g., vinyl methyl ketone, vinyl ethyl ketone, vinyl isopropenyl ketone), and olefins (e.g., ethylene, propylene, butadiene).

Examples of the binder resin further include non-vinyl resins, such as epoxy resins, polyester resins, polyurethane resins, polyamide resins, cellulose resins, polyether resins, and modified rosins; and mixtures of these non-vinyl resins and the above vinyl resins, and graft polymers produced by polymerization of a vinyl monomer in the presence of these non-vinyl resins.

These binder resins may be used alone or in combination of two or more.

The binder resin may be a polyester resin. Examples of the polyester resin include amorphous polyester resins and crystalline polyester resins.

The term "crystalline" for polyester resins in the exemplary embodiment means that polyester resins show a distinct endothermic peak rather than stepwise endothermic changes as measured by differential scanning calorimetry (DSC) and specifically means that the full width at half maximum of the endothermic peak measured at a heating rate of 10° C./min is within 10° C.

The term "amorphous" for polyester resins in the exemplary embodiment means that polyester resins show a full width at half maximum of more than 10° C., show stepwise endothermic changes, or show no distinct endothermic peak.

Amorphous Polyester Resin

An amorphous polyester resin may be a commercial product or a synthetic product.

Examples of the amorphous polyester resin include a polycondensation polymer of a polycarboxylic acid and a polyhydric alcohol.

Examples of the polycarboxylic acid, which is a polymer component of the amorphous polyester resin, include aliphatic dicarboxylic acids (e.g., oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, naphthalene dicarboxylic acid), anhydrides thereof, and lower (e.g., C1 to C5) alkyl esters thereof. Of these, the polycarboxylic acid may be an aromatic dicarboxylic acid.

The polycarboxylic acid may be a combination of a dicarboxylic acid and a trivalent or higher valent carboxylic acid having a crosslinked structure or branched structure. Examples of the trivalent or higher valent carboxylic acid include trimellitic acid, pyromellitic acid, anhydrides thereof, and lower (e.g., C1 to C5) alkyl esters thereof.

The polycarboxylic acid may be used alone or in combination of two or more.

Examples of the polyhydric alcohol, which is a polymer component of the amorphous polyester resin, include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexane dimethanol, hydrogenated bisphenol A), and aromatic diols (e.g., an ethylene oxide adduct of bisphenol A, and a propylene oxide adduct of bisphenol A). Of these, the polyhydric alcohol is preferably, for example, an aromatic diol or an alicyclic diol, and more preferably an aromatic diol.

The polyhydric alcohol, which is a polymer component of the amorphous polyester resin, may be a combination of a diol and a trihydric or higher polyhydric alcohol having a crosslinked structure or branched structure. Examples of the trihydric or higher polyhydric alcohol include glycerol, trimethylolpropane, and pentaerythritol.

The polyhydric alcohol may be used alone or in combination of two or more.

The glass transition temperature (Tg) of the amorphous polyester resin is preferably 50° C. or higher and 80° C. or lower, more preferably 50° C. or higher and 65° C. or lower.

The glass transition temperature is determined from the DSC curve obtained by differential scanning calorimetry (DSC) and, more specifically, determined in accordance with "extrapolated glass transition onset temperature" described in the method for determining the glass transition temperature in JIS K 7121-1987 "Testing Methods for Transition Temperatures of Plastics".

The weight average molecular weight (Mw) of the amorphous polyester resin is preferably 5,000 or more and 1,000,000 or less, more preferably 7,000 or more and 500,000 or less.

The number average molecular weight (Mn) of the amorphous polyester resin is preferably 2,000 or more and 100,000 or less.

The molecular weight distribution Mw/Mn of the amorphous polyester resin is preferably 1.5 or more and 100 or less, more preferably 2 or more and 60 or less.

The weight average molecular weight and the number average molecular weight are determined by gel permeation chromatography (GPC). The determination of the molecular weight by GPC is carried out by using a GPC HLC-8120GPC available from Tosoh Corporation as a measuring system, a column TSKgel SuperHM-M (15 cm) available from Tosoh Corporation, and a THF solvent. The weight average molecular weight and the number average molecular weight are calculated from the molecular weight calibration curve created on the basis of the obtained measurement results using a monodisperse polystyrene standard.

The amorphous polyester resin is produced by using a known production method. Specifically, the amorphous polyester resin is produced by using, for example, causing reaction at a polymerization temperature of 180° C. or higher and 230° C. or lower in a reaction system under vacuum as necessary while removing water and an alcohol generated during condensation.

If the monomers serving as materials are neither dissolved in nor compatible with each other at the reaction temperature, the monomers may be dissolved by adding a solvent with a high boiling point as a solubilizer. In this case, the polycondensation reaction is carried out while the solubilizer is distilled off. If a monomer with poor compatibility is present in the copolymerization reaction, the monomer with poor compatibility is previously subjected to condensation with an acid or alcohol that is to undergo polycondensation with the monomer, and the resulting condensate is then subjected to polycondensation with a main component.

Crystalline Polyester Resin

The crystalline polyester resin may be a commercial product or a synthetic product.

Examples of the crystalline polyester resin include a polycondensate of a polycarboxylic acid and a polyhydric alcohol. The crystalline polyester resin may be a polycondensate produced by using a straight-chain aliphatic polymerizable monomer rather than a polymerizable monomer having an aromatic ring in order to easily form a crystal structure.

Examples of the polycarboxylic acid, which is a polymer component of the crystalline polyester resin, include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids, such as phthalic acid, isophthalic acid, terephthalic acid, and naphthalene-2,6-dicarboxylic acid), anhydrides thereof, and lower (e.g., C1 to C5) alkyl esters thereof.

The polycarboxylic acid may be a combination of a dicarboxylic acid and a trivalent or higher valent carboxylic acid having a crosslinked structure or branched structure. Examples of the trivalent carboxylic acid include aromatic carboxylic acids (e.g., 1, 2, 3-benzenetricarboxylic acid, 1,2,4-benzenetricarboxylic acid, and 1,2,4-naphthalenetricarboxylic acid), anhydrides thereof, and lower (e.g., C1 to C5) alkyl esters thereof. The polycarboxylic acid may be a combination of these dicarboxylic acids and a dicarboxylic acid having a sulfonic acid group or a dicarboxylic acid having an ethylenic double bond.

The polycarboxylic acid may be used alone or in combination of two or more.

Release Agent

Examples of the release agent include hydrocarbon waxes; natural waxes, such as carnauba wax, rice wax, and candelilla wax; synthetic or mineral and petroleum waxes, such as montan wax; and ester waxes, such as waxes of fatty acid esters and montanic acid esters. The release agent is not limited to these.

The melting temperature of the release agent is preferably 50° C. or higher and 110° C. or lower, more preferably 60° C. or higher and 100° C. or lower.

The melting temperature of the release agent is determined from the DSC curve obtained by differential scanning calorimetry (DSC) in accordance with "melting peak temperature" described in the method for determining the melting temperature in JIS K 7121:1987 "Testing Methods for Transition Temperatures of Plastics".

Colorant

Examples of the colorant include pigments, such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, malachite green oxalate; and dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes. The colorant may be used alone or in combination of two or more.

The colorant may be surface-treated as necessary, or may be used in combination with a dispersant.

A dispersion formed by mixing two or more particle dispersions is referred to as a "mixed dispersion".

After mixing two or more particle dispersions, the pH of the mixed dispersion may be adjusted in the range of 3 to 4. Examples of the method for adjusting the pH of the mixed dispersion include addition of an aqueous solution of nitric acid, an aqueous solution of hydrochloric acid, or an aqueous solution of sulfuric acid, which is an acidic aqueous solution.

The mass ratio of the particles contained in the mixed dispersion may be in the following range.

When the mixed dispersion contains the release agent particles, the mass ratio of the binder resin particles to the release agent particles (binder resin particles: release agent particles) is preferably from 100:3 to 100:30, more preferably from 100:5 to 100:25, still more preferably from 100:8 to 100:20.

When the mixed dispersion contains the colorant particles, the mass ratio of the binder resin particles to the colorant particles (binder resin particles: colorant particles) is preferably from 100:5 to 100:35, more preferably from 100:7 to 100:30, still more preferably from 100:9 to 100:25.

The volume average particle size of the binder resin particles in the mixed dispersion is preferably 30 nm or more and 460 nm or less, more preferably 50 nm or more and 300 nm or less, still more preferably 60 nm or more and 250 nm or less, yet still more preferably 80 nm or more and 200 nm or less.

The volume average particle size of the particles in the particle dispersion refers to the particle size at 50% cumulative volume from the smallest particle size in the particle size distribution measured with a laser diffraction-type particle size distribution analyzer (e.g., LA-700 available from Horiba Ltd).

The total mass of the binder resin particles in the mixed dispersion relative to the total amount of the produced toner particles is preferably 50 mass % or more and 90 mass % or less, more preferably 55 mass % or more and 90 mass % or less, still more preferably 60 mass % or more and 90 mass % or less.

A method for preparing the first dispersion containing the first aggregated particles dispersed therein may include: for example, adding an aggregating agent to the mixed dispersion while stirring the mixed dispersion; and after adding the aggregating agent to the mixed dispersion, increasing the temperature of the mixed dispersion by heating the mixed dispersion while stirring the mixed dispersion.

Examples of the aggregating agent include surfactants having polarity opposite to the polarity of the surfactant contained in the mixed dispersion, inorganic metal salts, and divalent or higher valent metal complexes. The aggregating agent may be used alone or in combination of two or more.

Examples of inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The aggregating agent is preferably a divalent or higher valent metal salt compound, more preferably a trivalent metal salt compound, still more preferably a trivalent inorganic aluminum salt compound. Examples of trivalent inorganic aluminum salt compounds include aluminum chloride, aluminum sulfate, polyaluminum chloride, and polyaluminum hydroxide.

The amount of the aggregating agent added is not limited. When a trivalent metal salt compound is used as an aggregating agent, the amount of the trivalent metal salt compound added relative to 100 parts by mass of the binder resin is preferably 0.01 parts by mass or more and 10 parts by mass or less, more preferably 0.05 parts by mass or more and 5 parts by mass or less, still more preferably 0.1 parts by mass or more and 3 parts by mass or less.

The temperature reached by the mixed dispersion during heating of the mixed dispersion may be, for example, (Tg-30° C.) or higher and (Tg-10° C.) or lower, where Tg is the glass transition temperature of the binder resin particles. When the mixed dispersion contains two or more binder resin particles having different Tgs, the lowest Tg among the Tgs is defined as the Tg of the binder resin particles. The first dispersion containing, dispersed therein, the first aggregated particles containing a binder resin (or containing a binder resin, a release agent, and a colorant) is prepared as described above.

Step B

In the method for producing a toner according to the exemplary embodiment, the step B is performed after the step A.

The step B involves preparing a second dispersion containing second aggregated particles dispersed therein, wherein the second aggregated particles are prepared by attaching resin particles to surfaces of the first aggregated particles in the first dispersion.

A method for preparing the second aggregated particles includes, for example, mixing the first dispersion containing the first aggregated particles and a dispersion containing resin particles so that the resin particles are attached to the surfaces of the first aggregated particles.

The dispersion containing the resin particles to be mixed with the first dispersion is preferably at least one selected from binder resin particle dispersions used for preparing the first aggregated particles in the step A, more preferably a polyester resin particle dispersion. In other words, the second aggregated particles may be prepared by attaching the binder resin particles to the surfaces of the first aggregated particles.

A method for preparing the second dispersion containing the second aggregated particles dispersed therein may include: for example, adding the dispersion containing the resin particles to the first dispersion while stirring the first dispersion containing the first aggregated particles dispersed therein; and after adding the dispersion containing the resin particles, heating the dispersion containing the first aggregated particles having the resin particles attached to the surfaces while stirring the dispersion.

The temperature reached by the dispersion containing the first aggregated particles having the resin particles attached to the surfaces during heating of the dispersion may be, for example, (Tg-30° C.) or higher and (Tg-10° C.) or lower, where Tg is the glass transition temperature of the resin particles.

The second dispersion containing, dispersed therein, the second aggregated particles formed by attaching the resin particles to the surfaces of the first aggregated particles is prepared as described above.

Step E

In the method for producing a toner according to the exemplary embodiment, a step E of growing the second aggregated particles to a desired size and then stopping the growth of the second aggregated particles may be performed after the step B and before the step C.

A method for stopping the growth of the second aggregated particles includes, for example, adding a chelator for the aggregating agent used in the step A.

Examples of the chelator include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

The amount of the chelator added relative to 100 parts by mass of the binder resin particles is preferably 0.01 parts by mass or more and 5.0 parts by mass or less and more preferably 0.1 parts by mass or more and less than 3.0 parts by mass.

The method for stopping the growth of the second aggregated particles may involve increasing the pH of the second dispersion.

A means of increasing the pH of the second dispersion includes, for example, adding at least one selected from the group consisting of aqueous solutions of alkali metal hydroxides and aqueous solutions of alkaline earth metal hydroxides.

Examples of aqueous solutions of alkali metal hydroxides and aqueous solutions of alkaline earth metal hydroxides include an aqueous solution of sodium hydroxide, an aqueous solution of potassium hydroxide, an aqueous solution of calcium hydroxide, and an aqueous solution of barium hydroxide. An aqueous solution of sodium hydroxide may be used.

The pH reached by the second dispersion may be 8 or higher and 10 or lower.

The second dispersion containing, dispersed therein, the second aggregated particles that have grown to a desired size is prepared as described above.

Step C and Step D

In the method for producing a toner according to the exemplary embodiment, the step C and the step D are performed after the step B or the step E.

The step C involves heating the second dispersion to a fusion temperature at which the second aggregated particles in the second dispersion are fused to each other.

The step D involves holding the second dispersion at the fusion temperature.

The second aggregated particles are fused and coalesced to produce toner particles through the step C and the step D.

In the method for producing a toner according to the exemplary embodiment, 20 mass % or more of a weak acid relative to the mass of the second aggregated particles is added to the second dispersion in the step C or the step D, or in the step C and the step D.

In other words, 20 mass % or more of a weak acid relative to the mass of the second aggregated particles is added to the second dispersion in the process of heating the second dispersion in the step C and in the process of holding the temperature of the second dispersion in the step D.

In the step C, the second dispersion is heated to a fusion temperature at which the second aggregated particles are fused to each other. The fusion temperature is preferably higher than or equal to the glass transition temperature (Tg) of the binder resin, specifically more preferably (Tg+10° C.) of the binder resin or higher and (Tg+40° C.) of the binder resin or lower.

When the second aggregated particles include two or more binder resins having different Tgs, the highest Tg among the Tgs is defined as the Tg of the binder resin.

The heating rate to the fusion temperature is, for example, preferably 0.1° C./min or higher and 2.0° C./min or lower, more preferably 0.2° C./min or higher and 1.0° C./min or lower.

The step D involves holding, at the fusion temperature, the second dispersion that has been heated in the step C. The holding time is the time until the second aggregated particles are fused and coalesced into coalesced particles (i.e., toner particles) having a desired circularity.

The circularity of the coalesced particles in the second dispersion is measured intermittently over time, and the step D is ended when the desired circularity is reached.

From the foregoing, the holding time varies depending on the desired circularity of the toner particles.

In the method for producing a toner according to the exemplary embodiment, a weak acid is added to the second dispersion in the step C or the step D, or in the step C and the step D.

The addition of the weak acid to the second dispersion may be performed in the step C or the step D, or in both the step C and the step D.

The weak acid may be added in the step D because the addition of the weak acid with the aggregated particles fused to some extent increases the amount of the weak acid relative to the surface area of the aggregated particles to improve the coalescence promoting effect.

The addition of the weak acid to the second dispersion may be performed once, or twice or more times. For example, the weak acid may be added to the second dispersion once, twice, or more times in the step C, and the weak acid may be further added to the second dispersion once, twice, or more times in the step D.

Addition of Weak Acid

The weak acid used in the method for producing a toner according to the exemplary embodiment refers to inorganic acids and organic acids with pka of 2 or more described in, for example, Chemistry Handbook Basics II (Maruzen Co., Ltd).

The weak acid may be at least one selected from the group consisting of carbonic acid, phosphoric acid, and carboxylic acid compounds from the viewpoint of availability and reactivity at the time of addition.

Examples of carboxylic acid compounds include acetic acid and citric acid.

The weak acid may be used alone or in combination of two or more.

The weak acid may be carbonic acid because carbonic acid can be added in the form of aqueous solution or in the form of gas.

In the method for producing a toner according to the exemplary embodiment, the addition of a weak acid to the second dispersion in the case of carbonic acid may be performed by adding carbonated water to the second dispersion, or may be performed by introducing carbon dioxide gas into the second dispersion. In particular, the addition of a weak acid to the second dispersion may be performed by introducing carbon dioxide gas into the second dispersion in order to effectively suppress generation of coarse powder.

The addition of carbonated water to the second dispersion may be performed in the step C or the step D, or in both the step C and the step D as long as 20 mass % or more of carbonic acid relative to the mass of the second aggregated particles is added.

The addition of carbonated water to the second dispersion may be performed in one step, or may be performed in two or more separate steps.

The concentration of carbonic acid in carbonated water added to the second dispersion is preferably 0.05 mol/L or more and 0.70 mol/L or less, more preferably 0.10 mol/L or more and 0.60 mol/L or less in order to suppress generation of coarse powder.

The introduction of carbon dioxide gas into the second dispersion may be performed in the step C or the step D, or in both the step C and the step D as long as 20 mass % or more of weak acid relative to the mass of the second aggregated particles is added.

The introduction of carbon dioxide gas into the second dispersion may be performed once, or twice or more times.

A method for introducing carbon dioxide gas into the second dispersion includes, for example, blowing carbon dioxide gas into a container containing the second dispersion under a pressure of 0.05 MPa or more and 0.60 MPa or less for 2 seconds or longer and 30 seconds or shorter.

The amount of carbonic acid added to the second dispersion may be controlled by adjusting the blowing pressure and the blowing time at/for which carbon dioxide gas is blown into the container containing the second dispersion.

The purity of carbon dioxide gas introduced into the second dispersion is preferably as high as possible, and more preferably, for example, 90% or higher.

In the method for producing a toner according to the exemplary embodiment, the amount of weak acid added to the second dispersion relative to the mass of the second aggregated particles is 20 mass % or more, preferably 25 mass % or more, more preferably 30 mass % or less in order to suppress generation of coarse powder.

If the amount of the weak acid added to the second dispersion is too large, the pH of the second dispersion to which the weak acid has been added may decrease excessively, and the repulsive force between the second aggregated particles may decrease, which may cause adhesion between the particles and may easily generate coarse powder.

From the foregoing reason, the addition of weak acid is preferably ended before the second dispersion reaches pH 7, and is more preferably ended before the second dispersion reaches pH 7.2.

From the foregoing reason, 90 mass % or less of weak acid is preferably added, and 80 mass % or less of weak acid is more preferably added relative to the mass of the second aggregated particles. In other words, the addition of weak acid may be ended before the amount of weak acid added reaches 90 mass % (or 80 mass %) relative to the mass of the second aggregated particles.

In the case of using a weak acid other than carbonic acid, the weak acid may be added to the second dispersion by preparing an aqueous solution containing the weak acid and adding the aqueous solution to the second dispersion.

In this case, the concentration of the weak acid in the aqueous solution is not limited but may be in the same range as the concentration of carbonic acid described above.

The amount of the surfactant in the second dispersion after the step D may be 5 mass % or less relative to the total solid content in the second dispersion.

To regulate the amount of the surfactant in the second dispersion after the step D at the above-described upper limit or less, no surfactant may be used in the step C and the step D. In general, the fusion of the second aggregated particles is promoted by using a surfactant in at least one of the step C or the step D. In the method for producing a toner according to the exemplary embodiment, however, the fusion of the second aggregated particles may be promoted by using a weak acid and regulating the amount of the weak acid at a particular value or more as described above without using a surfactant. As a result, the fusion time can also be shortened.

Furthermore, the surfactant used to produce toner particles in the EA method is wasted together with a washing liquid and the like, but the treatment of the waste liquid containing the surfactant may require a large burden and high costs. The waste liquid is easily treated when the amount of the surfactant in the second dispersion after the step D is the above-described upper limit or less.

The toner particles having a desired circularity are produced accordingly.

Other Steps

After completion of the step D, the toner particles in the dispersion are subjected to a known washing step, a known solid-liquid separation step, and a known drying step to produce dry toner particles.

The washing step may involve sufficient displacement washing with ion exchange water in view of charging characteristics. The solid-liquid separation step may involve, for example, suction filtration or pressure filtration in view of productivity. The drying step may involve, for example, freeze drying, flush drying, fluidized bed drying, or vibratory fluidized bed drying in view of productivity.

Step of Externally Adding External Additives

The toner production method according to the exemplary embodiment may include a step of externally adding external additives to the toner particles.

The external addition of external additives to the toner particles is carried out by mixing the dry toner particles and the external additives. Mixing is performed with a V-blender, a Henschel mixer, a Lodige mixer, or other mixers. In addition, coarse toner particles may be removed with a vibratory screening machine, a wind-power screening machine, or other machines, as necessary.

Examples of external additives include inorganic particles. Examples of the inorganic particles include $SiO_2$, $TiO_2$, $Al_2O_3$, CuO, Zno, $SnO_2$, $CeO_2$, $Fe_2O_3$, MgO, Bao, Cao, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, and $MgSO_4$.

The surfaces of the inorganic particles serving as an external additive may be hydrophobized. The hydrophobization treatment is performed by, for example, immersing the inorganic particles in a hydrophobizing agent. Examples of the hydrophobizing agent include, but are not limited to, a silane coupling agent, a silicone oil, a titanate coupling agent, and an aluminum coupling agent. These hydrophobizing agents may be used alone or in combination of two or more.

The amount of the hydrophobizing agent is normally, for example, 1 part by mass or more and 10 parts by mass or less relative to 100 parts by mass of the inorganic particles.

Examples of external additives also include resin particles (resin particles made of, for example, polystyrene, polymethyl methacrylate, and melamine resin), and cleaning active agents (e.g., higher fatty acid metal salts, such as zinc stearate, and fluoropolymer particles).

The amount of external additives externally added relative to the mass of the toner particles is preferably 0.01 mass % or more and 5 mass % or less, and more preferably 0.01 mass % or more and 2.0 mass % or less.

Toner

The toner produced by the production method according to the exemplary embodiment may be toner with the external additives on toner particles. The forms of the external additives are as described above.

The toner produced by the production method according to the exemplary embodiment may include toner particles having a core-shell structure having a core part (core) and a coating layer (shell layer) covering the core part. In particular, the toner particles having a core-shell structure may have: for example, a core part containing a binder resin, a release agent, and a colorant; and a coating layer containing a resin.

The amount of the binder resin relative to the total mass of the toner particles is preferably 40 mass % or more and 95 mass % or less, more preferably 50 mass % or more and 90 mass % or less, still more preferably 60 mass % or more and 85 mass % or less.

When the toner particles contain a release agent, the amount of the release agent relative to the entire toner particles is preferably 1 mass % or more and 20 mass or less, more preferably 5 mass % or more and 15 mass % or less.

When the toner contains a colorant, the amount of the colorant relative to the entire toner particles is preferably 1 mass % or more and 30 mass % or less, and more preferably 3 mass % or more and 15 mass % or less.

The volume average particle size of the toner particles is preferably 2 μm or more and 10 μm or less, more preferably 4 μm or more and 8 μm or less.

The volume average particle size of the toner particles is measured by using Coulter Multisizer II (available from Beckman Coulter, Inc.) and electrolyte ISOTON-II (available from Beckman Coulter, Inc.). Before measurement, 0.5 mg or more and 50 mg or less of a test sample is added to 2 ml of a 5 mass % aqueous solution of a surfactant (e.g., sodium alkylbenzene sulfonate) serving as a dispersant. The resulting mixture is added to 100 ml or more and 150 ml or less of the electrolyte.

The electrolyte in which the sample is suspended is subjected to a dispersion treatment using an ultrasonic disperser for 1 minute, and the particle size distribution of particles having a particle size in the range of 2 μm or more and 60 μm or less is measured by using Coulter Multisizer II with an aperture having a diameter of 100 μm. The number of sampled particles is 50,000. The particle size distribution is drawn from the smallest particle size, and the particle size at 50% cumulative volume is defined as a volume average particle size D50v.

The average circularity of the toner particles is preferably 0.94 or more and 1.00 or less, more preferably 0.95 or more and 0.98 or less.

The average circularity of the toner particles is (the circumference of a circle having the same area as the projected particle image)/(the circumference of the projected particle image). The average circularity is determined by sampling 3500 toner particles using a flow particle image analyzer (Sysmex FPIA-3000).

Developer

The toner produced by the production method according to the exemplary embodiment may be used as a one-component developer, or may be mixed with a carrier and used as a two-component developer.

The carrier is not limited, and may be a known carrier. Examples of the carrier include a coated carrier obtained by coating, with resin, the surface of a core material composed of magnetic powder; a magnetic powder-dispersed carrier in which magnetic powder is dispersed in matrix resin; and a resin-impregnated carrier in which porous magnetic powder is impregnated with resin.

The magnetic powder-dispersed carrier or the resin-impregnated carrier may be a carrier having constituent particles as a core material and a resin covering the surfaces of the constituent particles.

Examples of the magnetic powder include powders made of magnetic metals, such as iron, nickel, and cobalt; and powders made of magnetic oxides, such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin including an organosiloxane bond, and modified products thereof, fluorocarbon resin, polyester, polycarbonate, phenolic resin, and epoxy resin. The coating resin and the matrix resin may contain other additives, such as conductive particles. Examples of the conductive particles include particles made of metals, such as gold, silver, and copper; and particles made of carbon black, titanium oxide, zinc oxide, tin oxide, barium sulfate, aluminum borate, and potassium titanate.

The surface of the core material is coated with resin by, for example, a coating method using a coating layer-forming solution in which a resin for coating and various additives (used as necessary) are dissolved in an appropriate solvent. The solvent is not limited and may be selected in consideration of the type of resin used, coating suitability, and the like.

Specific examples of the resin coating method include an immersion method that involves immersing the core material in the coating layer-forming solution; a spray method that involves spraying the coating layer-forming solution onto the surface of the core material; a fluidized bed method that involves spraying the coating layer-forming solution onto the core material while floating the core material in air flow; and a kneader-coater method that involves mixing the core material of the carrier and the coating layer-forming solution in a kneader-coater, and then removing the solvent.

The mixing ratio (mass ratio) of the toner to the carrier in a two-component developer is preferably from 1:100 to 30:100 (=toner: carrier), and more preferably from 3:100 to 20:100.

EXAMPLES

Exemplary embodiments of the present disclosure will be described below in detail by way of Examples, but exemplary embodiments of the present disclosure are not limited to these Examples.

In the following description, the units "part" and "%" are on a mass basis, unless otherwise specified.

The synthesis, the treatment, the production, and other processes are carried out at room temperature (25° C.+3° C.) unless otherwise specified.

Preparation of Particle Dispersion

Preparation of Polyester Resin Particle Dispersion (P)

Polyoxypropylene (2,2)-2,2-bis(4-hydroxyphenyl) propane: 80 parts by mole
Ethylene glycol: 10 parts by mole
Cyclohexanediol: 10 parts by mole
Terephthalic acid: 80 parts by mole
Isophthalic acid: 10 parts by mole
n-Dodecenyl succinic acid: 10 parts by mole The materials described above are placed in a reaction container equipped with a stirrer, a thermometer, a condenser, and a nitrogen gas inlet tube, and the reaction container is purged with dry nitrogen gas. Next, 0.25 parts of titanium tetrabutoxide relative to 100 parts of the monomers is added as a catalyst. Under nitrogen gas flow, the mixture is caused to react under stirring at 170° C. for 3 hours, and the temperature is next increased to 210° C. over 1 hour. Next, the pressure in the reaction container is reduced to 3 kPa, and under the reduced pressure, the mixture is caused to react under stirring for 13 hours to produce a polyester resin. The glass transition temperature (Tg) of the obtained polyester resin is 58° C.

In a jacketed reaction vessel equipped with a condenser, a thermometer, a dropping device, and an anchor blade, 200 parts of polyester resin, 100 parts of methyl ethyl ketone, and 70 parts of isopropyl alcohol are placed and mixed by stirring at 100 rpm to dissolve the polyester resin while the mixture is maintained at 70° C. in a water-circulation thermostatic bath. Next, the number of rotation of stirring is set at 150 rpm, and the water-circulation thermostatic bath is set at 66° C., and 10 parts of 10% ammonia water is added over 10 minutes. Next, total 600 parts of ion exchange water kept at 66° C. is added dropwise at a rate of 5 parts/min to cause phase inversion and thus to form an emulsion. To a recovery flask are added 600 parts of the emulsion and 525 parts of ion exchange water. The recovery flask is set in an evaporator equipped with a vacuum control unit via an anti-splash trap. The solvent is removed by heating the recovery flask in a heating bath at 60° C. and reducing the pressure to 7 kPa with attention paid to bumping while rotating the recovery flask. At the time when the amount of the recovered solvent reaches 825 parts, the pressure is returned to normal pressure, and the recovery flask is cooled with water to provide a dispersion. The solid concentration is adjusted to 20% by addition of ion exchange water to provide a polyester resin particle dispersion (1). The volume average particle size of the polyester resin particle dispersion (1) is 180 nm. Preparation of Release Agent Particle Dispersion (W)·

Paraffin wax (HNP-9 available from Nippon Seiro Co., Ltd., melting temperature 75° C.): 50 parts Anionic surfactant (Neogen RK available from DKS Co. Ltd.): 5 parts Ion exchange water: 200 parts The materials described above are mixed, heated to 95° C., and dispersed by using a homogenizer (ULTRA-TURRAX T50 available from IKA). Next, the resulting dispersion is subjected to a dispersion treatment with a pressure discharge Gaulin homogenizer, and the solid concentration is adjusted to 20% by addition of water to provide a release agent particle dispersion (W). The volume average particle size of the release agent particle dispersion (W) is 190 nm. Preparation of Colorant Particle Dispersion (C)·

Cyan pigment (Pigment Blue 15:3, Dainichiseika Color & Chemicals Mfg. Co., Ltd.): 100 parts Anionic surfactant (Neogen R available from DKS Co. Ltd.): 2 parts Ion exchange water: 400 parts The materials described above are mixed and subjected to a dispersion treatment by using a high-pressure impact disperser (Ultimaizer HJP30006, Sugino Machine Limited) for 60 minutes to provide a colorant particle dispersion (C) with 20% solid content. The volume average particle size of the colorant particle dispersion (C) is 160 nm.

Example 1

Step A

Ion exchange water: 200 parts

Polyester resin particle dispersion (P): 100 parts

Release agent particle dispersion (W): 9 parts

Colorant particle dispersion (C): 10 parts

Anionic surfactant (Tayca Corporation, TaycaPower BN2060): 1 part

The materials described above are placed in a 2 L-cylindrical stainless steel container and mixed by stirring to provide a mixed dispersion. The mixed dispersion is adjusted to pH 3.0 by addition of 3 parts of a 0.3 M nitric acid aqueous solution.

While a shear force is applied to the mixed dispersion by using a homogenizer (Ultratalax T50 available from IKA Ltd.) at 6000 rpm, 2 parts of a 10% aqueous solution of aluminum sulfate serving as an aggregating agent is added dropwise to the mixed dispersion, and the mixture is stirred for 5 minutes.

Next, the mixed dispersion is heated to 45° C. in a mantle heater and held for 30 minutes to form first aggregated particles and thus to provide a first dispersion containing the first aggregated particles.

Step B

Twenty five parts of the polyester resin particle dispersion (P) is mixed with 10 parts of ion exchange water, and the mixture is adjusted to pH 3.0 to provide a resin particle dispersion (2).

The resin particle dispersion (2) is added to the first dispersion containing the first aggregated particles, and the mixture is held for 10 minutes. To stop the growth of the second aggregated particles, the second dispersion containing the second aggregated particles is then adjusted to pH 8.0 by addition of a 1 M aqueous solution of sodium hydroxide.

Step C

Next, the second dispersion containing the second aggregated particles is heated to 98° C. at a heating rate of 1° C./min.

Step D

After reaching 98° C., the second dispersion is held at this temperature, and the circularity of the second aggregated particles is measured after 30 minutes and found to be 0.93. Twelve parts of carbonated water adjusted to 0.2 mol/L is then added. The pH of the second dispersion after addition of carbonated water is 7.4. Thereafter, the circularity of the second aggregated particles is measured every 30 minutes, and the temperature of the second dispersion is maintained at 98° C. until the circularity reaches 0.98. The time until the circularity of the fused and coalesced second aggregated particles (i.e., toner particles) reaches 0.98 after the second dispersion reaches 98° C. is 2 hours.

The dispersion is then cooled to 30° C. at a cooling rate of 0.5° C./min. Next, the solids are filtered, washed with ion exchange water, and dried to form toner particles (1).

Example 2

Toner particles (2) are produced in the same manner as that in Example 1 except that the amount of carbonated water added in the step D is changed from 12 parts to 27 parts.

The pH of the second dispersion after addition of 27 parts of carbonated water is 6.8.

Example 3

Toner particles (3) are produced in the same manner as that in Example 1 except that the amount of carbonated water added in the step D is changed from 12 parts to 25 parts. The pH of the second dispersion after addition of 25 parts of carbonated water is 7.1.

Example 4

Toner particles (4) are produced in the same manner as that in Example 1 except that, in the step C, 9 parts of carbonated water adjusted to 0.2 mol/L is added to the second dispersion during heating, and in the step D, no carbonated water is added and the temperature of the second dispersion is maintained at 98° C. until the circularity of the second aggregated particles reaches 0.98.

The pH of the second dispersion after addition of 9 parts of carbonated water is 7.7.

Example 5

Toner particles (5) are produced in the same manner as that in Example 1 except that, in the step C, 6 parts of carbonated water adjusted to 0.2 mol/L is added to the second dispersion during heating, and the amount of carbonated water added in the step D is changed from 12 parts to 6 parts.

The pH of the second dispersion after addition of total 12 parts of carbonated water is 7.4.

Example 6

Toner particles (6) are produced in the same manner as in Example 1 except that the step D is as described below.

Step D

After reaching 98° C., the second dispersion is held at this temperature, and the circularity of the second aggregated particles is measured after 30 minutes and found to be 0.93. Carbon dioxide gas is then blown into the cylindrical stainless steel container containing the second dispersion at a pressure of 0.2 MPa for 10 seconds. Thereafter, the circularity of the second aggregated particles is measured every 30 minutes, and carbon dioxide gas is blown in the same manner repeatedly 3 times (i.e., carbon dioxide gas is blown into the cylindrical stainless steel container at a pressure of 0.2 MPa for 10 seconds repeatedly 3 times) until the circularity reaches 0.98. After carbon dioxide gas is blown total 4 times, the pH of the second dispersion is 7.3. While carbon dioxide gas is repeatedly blown, the temperature of the second dispersion is maintained at 98° C. The time until the circularity of the fused and coalesced second aggregated particles (i.e., toner particles) reaches 0.98 after the second dispersion reaches 98° C. is 2 hours.

The dispersion is then cooled to 30° C. at a cooling rate of 0.5° C./min. Next, the solids are filtered, washed with ion exchange water, and dried to form toner particles (6).

Example 7

Toner particles (7) are produced in the same manner as that in Example 6 except that, in the step D, carbon dioxide gas is blown into the cylindrical stainless steel container containing the second dispersion at a pressure of 0.2 MPa for 10 seconds repeatedly total 7 times.

The pH of the second dispersion after the blowing of carbon dioxide gas is 6.9.

Example 8

Toner particles (8) are produced in the same manner as that in Example 6 except that, in the step D, carbon dioxide gas is blown into the cylindrical stainless steel container containing the second dispersion at a pressure of 0.2 MPa for 11 seconds repeatedly total 6 times.

The pH of the second dispersion after the blowing of carbon dioxide gas is 7.2.

Example 9

Toner particles (9) are produced in the same manner as that in Example 6 except that, in the step C, carbon dioxide gas is blown into the cylindrical stainless steel container containing the second dispersion at a pressure of 0.2 MPa for 10 seconds total 3 times, and in the step D, no carbon dioxide gas is blown and the temperature of the second dispersion is maintained at 98° C. until the circularity of the second aggregated particles reaches 0.98.

The pH of the second dispersion after the blowing of carbon dioxide gas is 7.4.

Example 10

Toner particles (10) are produced in the same manner as that in Example 6 except that, in the step C, carbon dioxide gas is blown into the cylindrical stainless steel container containing the second dispersion at a pressure of 0.2 MPa for 8 seconds total 2 times, and in the step D, carbon dioxide gas is blown into the cylindrical stainless steel container containing the second dispersion at a pressure of 0.2 MPa for 10 seconds total 2 times.

The pH of the second dispersion after the blowing of carbon dioxide gas is 7.3.

Example 11

Toner particles (11) are produced in the same manner as that in Example 1 except that, in the step D, 14 parts of an aqueous solution of phosphoric acid adjusted to 0.2 mol/L is added instead of carbonated water.

The pH of the second dispersion after addition of 14 parts of the aqueous solution of phosphoric acid is 7.3.

Example 12

Toner particles (12) are produced in the same manner as that in Example 1 except that, in the step D, 13 parts of an aqueous solution of acetic acid adjusted to 0.2 mol/L is added instead of carbonated water.

The pH of the second dispersion after addition of 13 parts of the aqueous solution of phosphoric acid is 7.4.

Comparative Example 1

Toner particles (C1) are produced in the same manner as that in Example 1 except that, in the step D, 5 parts of hydrochloric acid adjusted to 0.2 mol/L is added instead of carbonated water.

The pH of the second dispersion after addition of 5 parts of hydrochloric acid is 6.8.

Comparative Example 2

Toner particles (C2) are produced in the same manner as that in Example 1 except that, in the step D, 3 parts of an aqueous solution of phosphoric acid adjusted to 0.2 mol/L is added instead of carbonated water.

The pH of the second dispersion after addition of 3 parts of the aqueous solution of phosphoric acid is 7.5.

Comparative Example 3

Toner particles (C3) are produced in the same manner as that in Example 1 except that, in the step D, 6 parts of an aqueous solution of phosphoric acid adjusted to 0.2 mol/L and 7 parts of an anionic surfactant are added instead of carbonated water.

The pH of the second dispersion after addition of 6 parts of the aqueous solution of phosphoric acid is 7.2.

Evaluation

Coarse Powder Content Evaluation 1

A toner dispersion containing 100 g of toner particles produced in Example is sifted through a sieve with a mesh size of 20 μm. The residue on the sieve is dried, and the mass (g) of the residue on the sieve is obtained. In this evaluation, the residue on the sieve is defined as coarse powder (i.e., coarse particles), and the proportion (mass %) of coarse powder in the toner particles is calculated from the following formula.

Proportion(mass %) of coarse powder=mass(g) of coarse powder(residue on sieve)/mass(100g) of toner particles×100

The coarse powder content is evaluated on the basis of the following criteria.

Criteria

G1: The proportion of coarse powder is less than 1 mass %.

G2: The proportion of coarse powder is 1 mass % or more and less than 2 mass %.

G3: The proportion of coarse powder is 2 mass % or more and less than 3 mass %.

G4: The proportion of coarse powder is 3 mass % or more.

Coarse Powder Content Evaluation 2

The particle size distribution of particles having a particle size in the range from 2 μm to 60 μm in toner particles produced in Example is determined by the method for measuring the volume average particle size of toner particles described above. The cumulative distribution of volume fraction is drawn from the smallest particle size as a function of divided particle size ranges (channels) of the obtained particle size distribution, and particles having a particle size of 15 μm or more are defined as coarse powder (i.e., coarse particles) in this evaluation. The volume fraction (vol %) of toner particles having a particle size of 15 μm or more in the obtained particle size distribution is determined.

The coarse powder content is evaluated on the basis of the following criteria.

G3: The transparency is slightly poor, but is within a practically acceptable level.

G4: Although flocs are generated, poor settlement and coloration occur (between G3 and G4 levels).

G5: Flocs are fine, and noticeable coloration occurs.

The evaluation results are summarized below in Table 1. Table 1 includes various conditions regarding addition of acid in the step C and the step D.

In Table 1, "whether surfactant is added or not" refers to whether the surfactant is added in the step C and the step D or not, and the value in the parentheses means the amount of the surfactant added.

TABLE 1

| | Step C and Step D | | | | | | | | Evaluation | | |
|---|---|---|---|---|---|---|---|---|---|---|---|
| | Type of acid | Whether surfactant is added or not (amount) | Step in which acid is added | Amount of acid added | Amount of acid added relative to second aggregated particles | pH of second dispersion of acid | Amount of surfactant in second dispersion after step D | Fusion time | Coarse powder content evaluation 1 | Coarse powder content evaluation 2 | Waste water treatment |
| Example 1 | carbonated water | not added | step D | 12 parts | 40 mass % | 7.5 | 1 mass % | 2 h | G1 | G1 | G1 |
| Example 2 | carbonated water | not added | step D | 27 parts | 94 mass % | 6.8 | 1 mass % | 1.5 h | G2 | G3 | G1 |
| Example 3 | carbonated water | not added | step D | 25 parts | 87 mass % | 7.1 | 1 mass % | 1.8 h | G2 | G2 | G1 |
| Example 4 | carbonated water | not added | step C | 9 parts | 31 mass % | 7.7 | 1 mass % | 2.4 h | G2 | G3 | G1 |
| Example 5 | carbonated water | not added | step C + step D | 6 parts + 6 parts | 40 mass % | 7.4 | 1 mass % | 1.7 h | G2 | G2 | G1 |
| Example 6 | carbon dioxide gas | not added | step D | 10 sec × 4 times | 52 mass % | 7.3 | 1 mass % | 2 h | G1 | G1 | G1 |
| Example 7 | carbon dioxide gas | not added | step D | 10 sec × 7 times | 91 mass % | 6.9 | 1 mass % | 1.7 h | G2 | G3 | G1 |
| Example 8 | carbon dioxide gas | not added | step D | 11 sec × 6 times | 86 mass % | 7.2 | 1 mass % | 2.1 h | G2 | G2 | G1 |
| Example 9 | carbon dioxide gas | not added | step C | 10 sec × 3 times | 39 mass % | 7.4 | 1 mass % | 2.3 h | G2 | G3 | G1 |
| Example 10 | carbon dioxide gas | not added | step C + step D | 8 sec × 2 times + 10 sec × 2 times | 60 mass % | 7.3 | 1 mass % | 1.9 h | G2 | G2 | G1 |
| Example 11 | aqueous solution of phosphoric acid | not added | step D | 14 parts | 49 mass % | 7.3 | 1 mass % | 1.8 h | G2 | G2 | G1 |
| Example 12 | aqueous solution of acetic acid | not added | step D | 13 parts | 45 mass % | 7.4 | 1 mass % | 1.9 h | G2 | G2 | G1 |
| Comparative Example 1 | hydrochloric acid | not added | step D | 5 parts | 17 mass % | 6.8 | 1 mass % | 3 h | G4 | G4 | G1 |
| Comparative Example 2 | aqueous solution of phosphoric acid | not added | step D | 3 parts | 10 mass % | 7.5 | 1 mass % | 5 h | G3 | G4 | G1 |
| Comparative Example 3 | aqueous solution of phosphoric acid | added (7 parts) | step D | 6 parts | 21 mass % | 7.2 | 5.3 mass % | 4 h | G2 | G3 | G4 |

Criteria

G1: The proportion of coarse powder is less than 0.5 vol %.

G2: The proportion of coarse powder is 0.5 vol % or more and less than 1.0 vol %.

G3: The proportion of coarse powder is 1.0 vol % or more and less than 2.0 vol %.

G4: The proportion of coarse powder is 2.0 vol % or more.

Waste Water Treatment Evaluation

The following aggregation settlement is evaluated by using ion exchange water (used washing liquid) with which toner particles have been washed in Example.

To 100 ml of the used washing liquid are added 300 mg of ferric chloride and 5 mg of polymer aggregating agent (anionic compound, available from Kurita Water Industries Ltd.) to form flocs, and the condition of the flocs is visually checked and evaluated according to the following criteria. G3 or higher are practically acceptable levels.

G1: Flocs are large, and the liquid has very high transparency.

G2: Flocs are slightly fine, but the transparency is high (between G1 and G3 levels).

Table 1 shows that, in the production methods of Examples, toner with less coarse powder is produced for a shorter fusion time than that in the production methods in Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a toner for developing electrostatic charge images, the method comprising:

preparing a first dispersion comprising, dispersed therein, first aggregated particles comprising a binder resin;

preparing a second dispersion comprising second aggregated particles dispersed therein, the second aggregated particles being prepared by attaching resin particles to surfaces of the first aggregated particles in the first dispersion;

heating the second dispersion to a fusion temperature at which the second aggregated particles in the second dispersion are fused to each other; and holding the second dispersion at the fusion temperature, wherein 20 mass % or more of a weak acid relative to a mass of the second aggregated particles is added to the second dispersion during the heating of the second dispersion or the holding of the second dispersion, or during the heating of the second dispersion and the holding of the second dispersion, and wherein the weak acid is carbonic acid.

2. The method for producing a toner for developing electrostatic charge images according to claim 1, wherein the addition of the weak acid to the second dispersion is performed by adding carbonated water to the second dispersion.

3. The method for producing a toner for developing electrostatic charge images according to claim 1, wherein the addition of the weak acid to the second dispersion is performed by introducing carbon dioxide gas into the second dispersion.

4. The method for producing a toner for developing electrostatic charge images according to claim 1, wherein the addition of the weak acid is ended before the second dispersion reaches pH 7.

5. The method for producing a toner for developing electrostatic charge images according to claim 1, wherein 90 mass % or less of the weak acid relative to a mass of the second aggregated particles is added.

6. The method for producing a toner for developing electrostatic charge images according to claim 1, wherein an amount of a surfactant in the second dispersion after the holding of the second dispersion is 5 mass % or less relative to a total solid content in the second dispersion.

7. A toner for developing electrostatic charge images, the toner being produced by the method for producing a toner for developing electrostatic charge images according to claim 1.

8. An electrostatic charge image developer comprising:

the toner for developing electrostatic charge images, the toner being produced by the method for producing a toner for developing electrostatic charge images according to claim 1.

* * * * *